US012663794B2

(12) United States Patent
Izadi et al.

(10) Patent No.: US 12,663,794 B2
(45) Date of Patent: Jun. 23, 2026

(54) SYSTEMS AND METHODS FOR REDUCING THE LIKELIHOOD OF ROLLOVER FOR AN E-PALLET USING CAMERA BASED ON BANK ANGLE ESTIMATION

(71) Applicant: GM GLOBAL TECHNOLOGY OPERATIONS LLC, Detroit, MI (US)

(72) Inventors: Hojjat Izadi, North York (CA);
Jonathan From, Peterborough (CA);
Martin Juhas, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 548 days.

(21) Appl. No.: 18/299,273

(22) Filed: Apr. 12, 2023

(65) Prior Publication Data

US 2024/0345582 A1      Oct. 17, 2024

(51) Int. Cl.
*G05D 1/00*          (2024.01)
*G06T 7/246*         (2017.01)

(52) U.S. Cl.
CPC ........... *G05D 1/0246* (2013.01); *G06T 7/246* (2017.01); *G06T 2207/20081* (2013.01); *G06T 2207/30196* (2013.01); *G06T 2207/30252* (2013.01)

(58) Field of Classification Search
CPC ................. G05D 1/0246; G06T 7/246; G06T 2207/20081; G06T 2207/30196; G06T 2207/30252; B62B 5/00; B62B 3/14; B62B 5/0033; G01C 9/00; G01C 11/02; G06N 20/00
See application file for complete search history.

(56) References Cited

U.S. PATENT DOCUMENTS

| | | | | |
|---|---|---|---|---|
| 9,187,051 B2 * | 11/2015 | Feser | ...................... | G01S 3/784 |
| 11,379,954 B2 * | 7/2022 | Themelis | .................. | G06T 5/70 |
| 11,760,615 B2 * | 9/2023 | Draayer | ............... | B66F 9/0759 |
| | | | | 701/50 |
| 11,878,632 B2 * | 1/2024 | Briggs | .................. | G01C 21/20 |
| 2010/0157058 A1 * | 6/2010 | Feiden | ................ | B60W 40/112 |
| | | | | 348/148 |
| 2017/0004371 A1 * | 1/2017 | Getz | ......................... | G06T 7/74 |
| 2018/0300896 A1 * | 10/2018 | Zhang | ..................... | G06F 3/012 |
| 2021/0174548 A1 * | 6/2021 | Deng | ........................ | G06T 7/80 |

FOREIGN PATENT DOCUMENTS

| | | | | | |
|---|---|---|---|---|---|
| CN | 110872088 A | * | 3/2020 | ............... | B66F 9/24 |
| EP | 3839809 A1 | * | 6/2021 | .......... | G06V 40/171 |
| KR | 20220063803 A | * | 5/2022 | ............ | G06V 40/20 |
| TW | 202305533 A | * | 2/2023 | | |

* cited by examiner

*Primary Examiner* — Rachid Bendidi
*Assistant Examiner* — Hana Victoria Hall
(74) *Attorney, Agent, or Firm* — Ingrassia Fisher & Lorenz, LLP | IF&L

(57) ABSTRACT

Methods and systems for reducing the likelihood of rollover for an e-pallet are provided. The systems include one or more cameras configured to obtain camera data as to a user of the e-pallet, and a processor coupled to the one or more sensors and configured to at least facilitate determining, using the camera data, a relative orientation of the user, determining an e-pallet vertical vector based on the camera data and a user vertical vector based on the relative orientation of the user, determining a bank angle of the e-pallet based on the e-pallet vertical vector and the user vertical vector, and taking a control action for the e-pallet, in accordance with instructions provided by the processor, based on the bank angle.

20 Claims, 4 Drawing Sheets

SYSTEMS AND METHODS FOR REDUCING THE LIKELIHOOD OF ROLLOVER FOR AN E-PALLET USING CAMERA BASED ON BANK ANGLE ESTIMATION

INTRODUCTION

The technical field generally relates electric pallets, namely, devices with propulsion (e-pallets), and more specifically to systems and methods for reducing the likelihood of rollover for an e-pallet by determining a bank angle of the e-pallet and controlling operation of the e-pallet based on the bank angle.

Various e-pallets today are controlled via pulling and/or pushing by a user/operator, such as via physical touch by a human operator. However, current techniques for control of e-pallets may not be ideal under certain circumstances.

Accordingly, it is desirable to provide systems and methods for controlling of and interfacing with e-pallets. Furthermore, other desirable features and characteristics of the present invention will become apparent from the subsequent detailed description of the invention and the appended claims, taken in conjunction with the accompanying drawings and this background of the invention.

SUMMARY

A method is provided for reducing the likelihood of rollover for an e-pallet. In one embodiment, the method includes obtaining, via one or more cameras of the e-pallet, camera data as to a user of the e-pallet, determining, via the processor using the camera data, a relative orientation of the user, determining, via the processor, an e-pallet vertical vector based on the camera data and a user vertical vector based on the relative orientation of the user, determining, via the processor, a bank angle of the e-pallet based on the e-pallet vertical vector and the user vertical vector, and taking a control action for the e-pallet, in accordance with instructions provided by the processor, based on the bank angle.

In various embodiments, the step of determining the e-pallet vertical vector based on the camera data includes obtaining, via the one or more cameras, an image that includes a frame in which the user is depicted, and determining, via the processor, the e-pallet vertical vector based on a vertical edge of the frame of the image.

In various embodiments, the step of determining the user vertical vector based on the relative orientation of the user includes, via the processor, detecting key points associated with the user within the camera data, and determining the user vertical vector based on the key points using a machine learning algorithm.

In various embodiments, the step of taking the control action includes controlling movement of the e-pallet by selectively controlling a speed of the e-pallet and/or a yaw rate of the e-pallet, in accordance with the instructions provided by the processor, to remain below a preprogrammed safety threshold based on the bank angle, and potentially other variables such as load weight and distribution.

In various embodiments, the method includes, via the processor, determining whether the e-pallet vertical vector and the user vertical vector can be determined reliably based on a vertical vector reliability threshold, and performing the steps of determining the bank angle and taking the control action in response to a determination that the e-pallet vertical vector and the user vertical vector can be determined reliably.

In various embodiments, determining the bank angle of the e-pallet based on the e-pallet vertical vector and the user vertical vector includes, via the processor, determining a first difference between the e-pallet vertical vector and the user vertical vector based on the camera data at a first time to calculate a first bank angle, determining a second difference between the e-pallet vertical vector and the user vertical vector based on the camera data at a second time to calculate a second bank angle, and determining an estimated bank angle over time based on the first bank angle and the second bank angle.

In various embodiments, the method includes, via the processor, determining a reliability of the bank angle based on a bank angle reliability threshold, and taking the control action for the e-pallet, in accordance with instructions provided by the processor, based on the bank angle and the reliability of the bank angle.

A system is provided for reducing the likelihood of rollover for an e-pallet. In one embodiment, the system includes one or more cameras configured to obtain camera data as to a user of the e-pallet, and a processor coupled to the one or more cameras and configured to at least facilitate determining, using the camera data, a relative orientation of the user, determining an e-pallet vertical vector based on the camera data and a user vertical vector based on the relative orientation of the user, determining a bank angle of the e-pallet based on the e-pallet vertical vector and the user vertical vector, and taking a control action for the e-pallet, in accordance with instructions provided by the processor, based on the bank angle.

In various embodiments, determining the e-pallet vertical vector based on the camera data includes obtaining, via the one or more cameras, an image that includes a frame in which the user is depicted, and determining the e-pallet vertical vector based on a vertical edge of a frame of the image.

In various embodiments, determining the user vertical vector based on the relative orientation of the user includes detecting key points associated with the user within the camera data, and determining the user vertical vector based on the key points using a machine learning algorithm.

In various embodiments, taking the control action includes controlling movement of the e-pallet by selectively controlling a speed of the e-pallet and/or a yaw rate of the e-pallet, in accordance with the instructions provided by the processor, to remain below a preprogrammed safety threshold based on the bank angle, and potentially other variables such as load weight and distribution.

In various embodiments, the processor is configured to facilitate determining whether the e-pallet vertical vector and the user vertical vector can be determined reliably based on a vertical vector reliability threshold, and performing the steps of determining the bank angle and taking the control action in response to a determination that the e-pallet vertical vector and the user vertical vector can be determined reliably.

In various embodiments, determining the bank angle of the e-pallet based on the e-pallet vertical vector and the user vertical vector includes determining a first difference between the e-pallet vertical vector and the user vertical vector based on the camera data at a first time to calculate a first bank angle, determining a second difference between the e-pallet vertical vector and the user vertical vector based on the camera data at a second time to calculate a second bank angle, and determining an estimated bank angle over time based on the first bank angle and the second bank angle.

In various embodiments, the processor is configured to facilitate determining a reliability of the bank angle based on a bank angle reliability threshold, and taking the control action for the e-pallet, in accordance with instructions provided by the processor, based on the bank angle and the reliability of the bank angle.

An e-pallet device is provided that, in one embodiment, includes a body, one or more cameras disposed on or within the body and configured to camera data as to the user of the e-pallet device, and a processor that is coupled to the one or more cameras, the processor configured to at least facilitate determining, using the camera data, a relative orientation of the user, determining a e-pallet vertical vector based on the camera data and a user vertical vector based on the relative orientation of the user, determining a bank angle of the body based on the e-pallet vertical vector and the user vertical vector, and controlling movement of the body by selectively controlling a speed of the body and/or a yaw rate of the body, in accordance with the instructions provided by the processor, to remain below a preprogrammed safety threshold based on the bank angle.

In various embodiments, determining the e-pallet vertical vector based on the camera data includes obtaining, via the one or more cameras, an image that includes a frame in which the user is depicted, and determining, via the processor, the e-pallet vertical vector based on a vertical edge of the frame of the image.

In various embodiments, determining the user vertical vector based on the relative orientation of the user includes detecting key points associated with the user with the user within the camera data, and determining the user vertical vector based on the key points using a machine learning algorithm.

In various embodiments, the processor is configured to facilitate determining whether the e-pallet vertical vector and the user vertical vector can be determined reliably based on a vertical vector reliability threshold, and performing the steps of determining the bank angle and controlling movement of the body are performed upon a determination that the e-pallet vertical vector and the user vertical vector can be determined reliably.

In various embodiments, determining the bank angle of the body based on the e-pallet vertical vector and the user vertical vector includes determining a first difference between the e-pallet vertical vector and the user vertical vector based on the camera data at a first time to calculate a first bank angle, determining a second difference between the e-pallet vertical vector and the user vertical vector based on the camera data at a second time to calculate a second bank angle, and determining an estimated bank angle over time based on the first bank angle and the second bank angle.

In various embodiments, the processor is configured to facilitate determining a reliability of the bank angle based on a bank angle reliability threshold, and controlling the movement of the body, in accordance with instructions provided by the processor, based on the bank angle and the reliability of the bank angle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
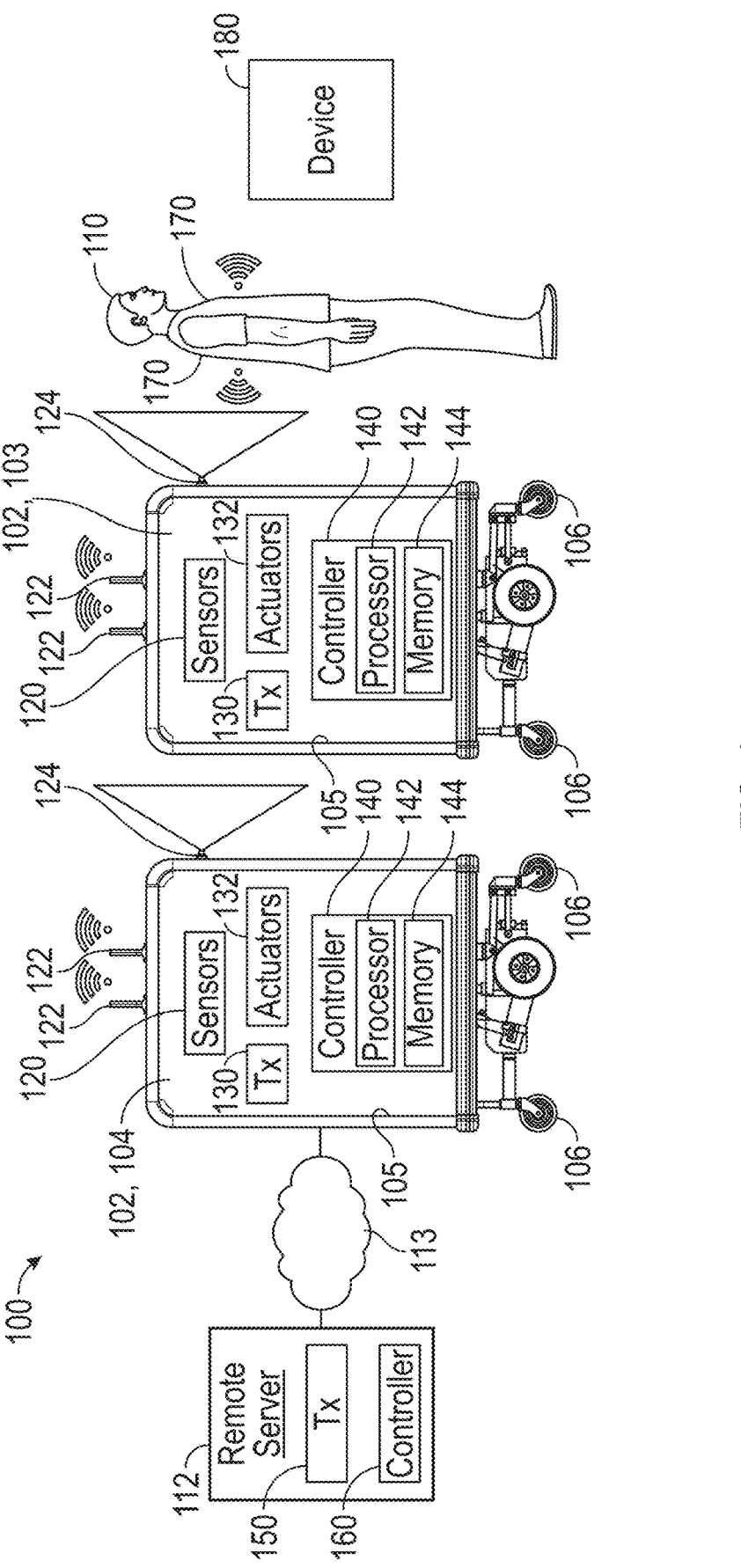
FIG. 1 is a functional diagram of a system including e-pallets and control for the e-pallets, in connection with an exemplary embodiment.

FIG. 1 illustrates a system 100 for control of electric pallets namely, devices with propulsion (e-pallets) 102, in accordance with an exemplary embodiment. While the term electric pallet and the abbreviation e-pallet are utilized herein and throughout the application, it will be appreciated that the terms "electric pallet" and "e-pallet" (as used may comprise any number of different types of pallets, carts (e.g., shopping carts, delivery carts, and/or other carts and/or similar types of apparatus), and/or any number of other types of moving platforms. In addition, while two e-pallets 102 are depicted in FIG. 1, it will be appreciated that in various embodiments the system 100 may include any number of e-pallets 102, for example a single e-pallet 102 and/or any number of multiple e-pallets 102 that are controlled in concert with one another.

As depicted in FIG. 1, in certain embodiments the system 100 may also include a user 110, a remote server 112, and a communications network 113. In certain embodiments, the system 100 may also include one or more additional components.

In the depicted embodiment, the multiple e-pallets 102 include a first e-pallet 103 and a second e-pallet 104. In various embodiments, in the configuration depicted in FIG. 1, the first e-pallet 103 may be considered a "leader" e-pallet that is in closest proximity to the user 110, and that directly follows the user 110. Also in various embodiments, in the configuration depicted in FIG. 1, the second e-pallet 104 may be considered a "follower" e-pallet that is relatively further from the user 110, and that directly follows the first e-pallet 103.

In various embodiments, the user 110 comprises an operator that interfaces with and provides one or more different types of commands for the e-pallets 102. In certain embodiments, the user 110 comprises a human being. In various embodiments, the user 110 is wearing one or more radio-based sensors (e.g., ultra-wide-band sensors) 170 that include anchors on both the front and back of the body of the user 110 (e.g., as a vest, in certain embodiments). Also in certain embodiments, the user 110 also possesses one or more electronic devices 180 (e.g., such as a smart phone, smart watch, or the like) that is configured to communicate with the e-pallets 102. In certain other embodiments, the user 110 may comprise a robot and/or other electronic devices.

Also in various embodiments, the e-pallets 102 interface with the user 110 in accordance with control of the e-pallets 102 that is conducted and/or facilitated by one or more computer systems (including one or more processors) that reside in the e-pallets 102, the remote server 112, or both. As depicted in FIG. 1, in various embodiments, the e-pallets 102 communicate with the remote server 112 via one or more communications networks 113 (e.g., one or more wireless communications networks, such as via one or more cellular-based communications networks, one or more satellite-based communications networks, and/or one or more other types of wireless communications networks).

As depicted in FIG. 1, in various embodiments each e-pallet 102 includes a body 105, one or more wheels 106, a sensor array 120, a transceiver 130, one or more actuators 132, and a controller 140.

In the depicted embodiment, the body 105 substantially encloses other components of the e-pallet 102. In certain embodiments, the wheels 106 are each rotationally coupled to one or more of the axles (not depicted) near a respective corner of the body 105 to facilitate movement of the e-pallet 102. However, this may vary in different embodiments. Similarly, the number and placement of the wheels 106 may also vary in different embodiments.

Figure 2:
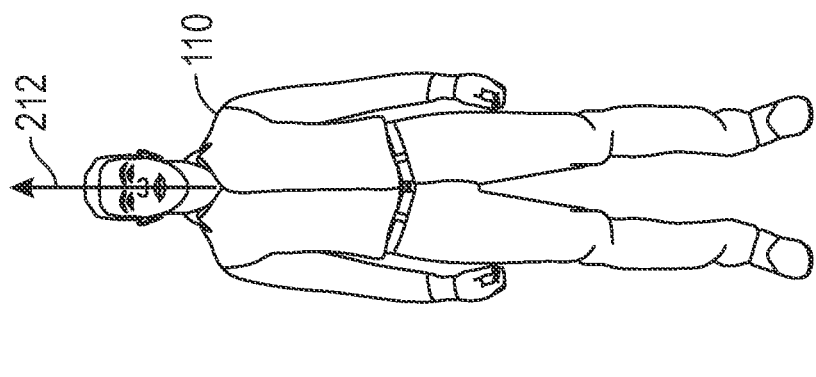
Figure 2:
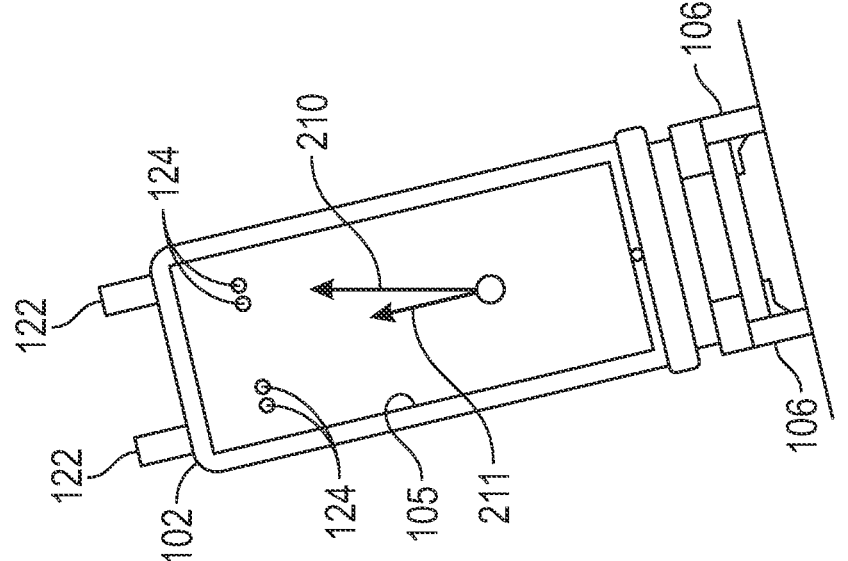

In various embodiments, the sensor array 120 includes a plurality of sensors that are used for communicating with the user 110 and for the e-pallets 102 to communicate with one another. As depicted in FIG. 2, in various embodiments the sensor array 120 includes one or more radio-based sensors 122 and one or more cameras 124.

In various embodiments, the radio-based sensors 122 communicate with and obtain sensor data from the radio-based sensors 170 worn by the user 110. In certain embodiments, the radio-based sensors 122 comprise one or more ultra-wide-band (UWB) sensors. Also in various embodiments, the cameras 124 are configured to obtain vision sensor data, including as to the user 110 and the other e-pallet(s) 102.

In various embodiments, the transceiver 130 is utilized to communicate with the remote server 112, for example as to the inputs received from the user 110 and/or the implementation of commands pertaining thereto. In various embodiments, the transceiver 130 is configured to receive the user inputs and/or other data from the electronic device 180 of the user 110. In addition, in certain embodiments, the transceiver 130 is also utilized to communicate with other e-pallet(s).

Also in various embodiments, the actuators 132 are used to move the e-pallet 102. Specifically, in various embodiments, the actuators 132 are configured to cause movement of the e-pallet 102 in one or more different directions and/or headings based on instructions provided by the controller 140 (and/or in certain embodiments from the remote server 112), for example in interpreting instructions or intent from the user 110.

In various embodiments, the controller 140 is coupled to the sensor array 120, the transceiver 130, and the actuators 132. In various embodiments the controller 140 utilizes sensor data, including radio sensor data (e.g., from ultra-wide-band sensors) and camera (i.e., vision) data (e.g., from cameras) in determining a relative distance and orientation between the e-pallets 102 and the user 110, for use in interfacing with the user 110 and for control of the e-pallets 102 by the user 110.

As depicted in FIG. 1, in various embodiments the controller 140 comprises a computer system that includes a processor 142 and a memory 144. In certain embodiments, the controller 140 may also include the sensor array 120, one or more of the other systems or components thereof, and/or one or more other platform components. In addition, it will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified platform devices and systems.

In various embodiments, the processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs contained within the memory 144 and, as such, controls the general operation of the controller 140 and the computer system of the controller 140, generally in executing the processes described herein.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program along with one or more stored values (e.g., including, in various embodiments, predetermined threshold values for controlling the e-pallets 102).

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

With continued reference to FIG. 1, in various embodiments the remote server 112 includes a transceiver 150 along with a controller 160 that includes a computer system, similar in structure and function to the corresponding components described above in connection with the e-pallets 102.

The e-pallets 102 include an enhanced rollover protection system configured to reduce the likelihood of the e-pallets 102 rolling over during propulsion thereof on non-level surfaces and/or while performing turning maneuvers. In general, if the e-pallet 102 is tilted to a sufficient angle, for example, due to traveling on a non-level surface, the e-pallet

102 may tip over. When rounding a corner, additional cornering forces act upon the e-pallet 102 that, if sufficient, may cause rollover of the e-pallet 102. Therefore, it would be beneficial to ensure that the e-pallets 102 do not travel on surfaces that are sufficiently non-level to cause the e-pallets 102 to tip, and to ensure that when rounding corners, the e-pallets 102 maintain a speed, yaw rate, and attitude that are within a safe operating range to avoid rollover.

In order to reduce the likelihood of rollover, the enhanced rollover protection system of the e-pallets 102 is configured to selectively control operation of the e-pallets 102 such that the speed, yaw-rate, and attitude of the of the e-pallets 102 remain within predetermined safe operating ranges. In various embodiments, the system may prevent the e-pallets 102 from traveling over a non-level surface to avoid tipping. In various embodiments, the system may dynamically adjust the speed and/or turning radius of the e-pallets 102 while performing a turning maneuver to avoid rollover.

To accomplish these functions, the e-pallets 102 are configured to determine a bank angle of the e-pallets 102 during operation thereof, and to take one or more control actions (e.g., reduce speed) based on the determined bank angle. In various embodiments, the bank angle may be determined using visual input collected by the one or more cameras 124 of the e-pallets 102. More specifically, the e-pallets 102 may use the user 110 as a reference for determining the bank angle of the e-pallets 102.

The processes disclosed herein rely on an assumption that a human body typically retains a substantially vertically-oriented posture while walking, even on non-level surfaces. Based on this assumption, the e-pallets 102 may determine the bank angle by comparing a first vertical vector associated with the e-pallets 102 with a second vertical vector calculated based on an orientation of the user 110. The difference between the first and second vertical vectors provides the bank angle of the e-pallets 102.

Figure 3:
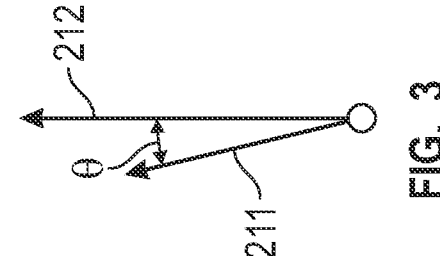
FIGS. 2 and 3 are diagrams illustrating various aspects of the system of FIG. 1 in accordance with an embodiment.

FIGS. 2 and 3 illustrate this relationship between the e-pallets 102 and the user 110. As represented, the e-pallet 102 is tilted laterally due to a slope of a non-level surface on which the e-pallet 102 is traveling. A vertical direction 210 represents the actual vertical direction, that is, opposite gravity. A first vertical vector 211 (referred to hereinafter as the e-pallet vertical vector 211) represents a vertical vector of the e-pallet 102, that is, corresponding to the actual vertical direction when the e-pallet 102 is on a level surface. The user 110 is represented as having an orientation that may be used to calculate a second vertical vector 212 (referred to hereinafter as the user vertical vector 212) which, for the purposes of the systems and methods disclosed herein, may be assumed to be substantially similar to the vertical direction 210. As illustrated in FIG. 3, the difference between the e-pallet vertical vector 211 and the user vertical vector 212 defines a bank angle θ of the e-pallet 102.

Figure 4:
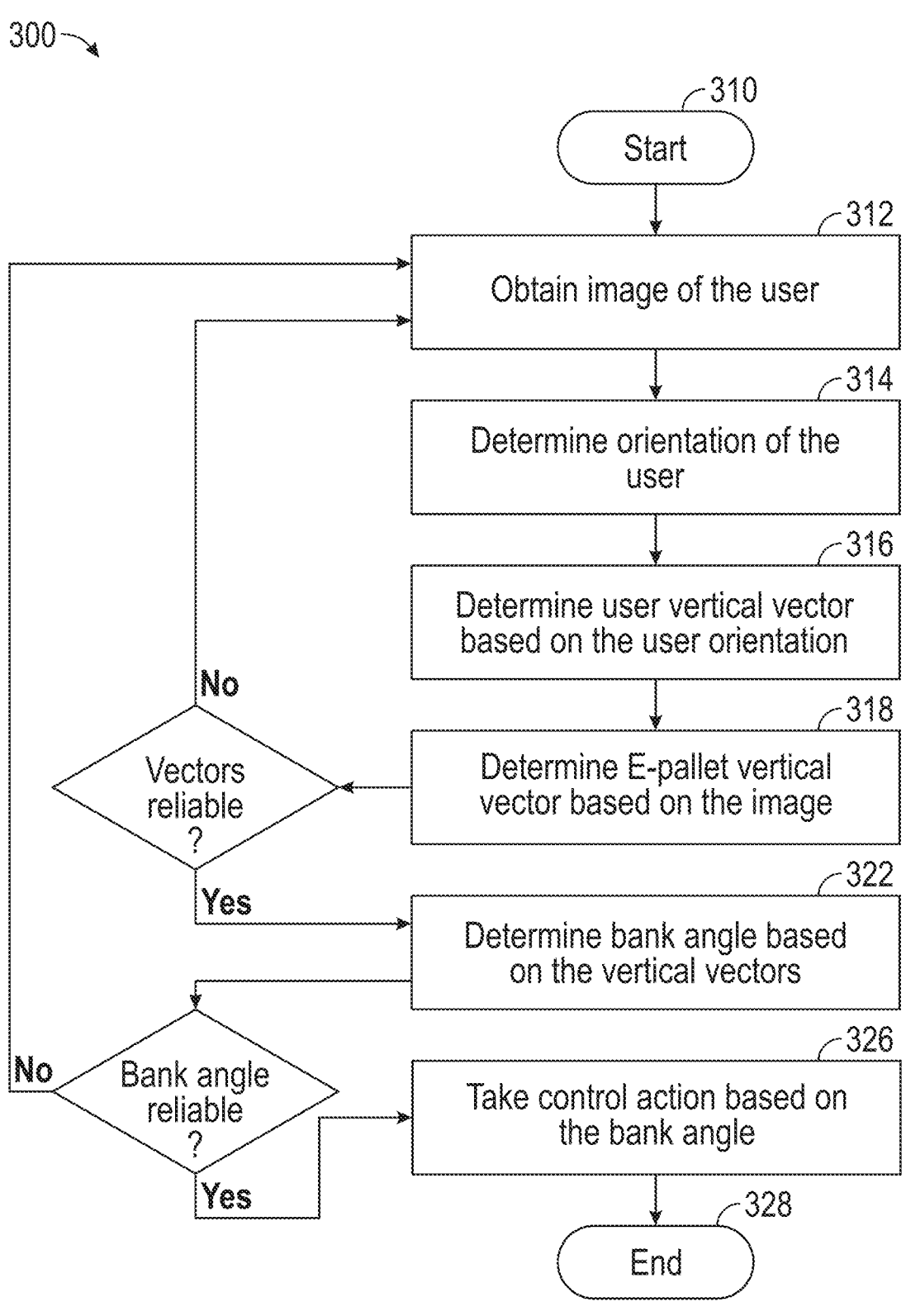
FIG. 4 is a flowchart of a method for reducing the likelihood of rollover for an e-pallet, and that can be incorporated in connection with the system of FIG. 1, in accordance with an exemplary embodiment.

With reference now to FIG. 4 and with continued reference to FIGS. 1-3, a flowchart provides a method 300 for rollover protection as performed by the enhanced rollover protection system of the e-pallet 102, in accordance with exemplary embodiments. As can be appreciated in light of the disclosure, the order of operation within the method 300 is not limited to the sequential execution as illustrated in FIG. 4, but may be performed in one or more varying orders as applicable and in accordance with the present disclosure. In various embodiments, the method 300 can be scheduled to run based on one or more predetermined events, and/or can run continuously during operation of the e-pallet 102.

In one example, the method 300 begins at 210. At 312, the method 300 includes obtaining, via the one or more cameras

124 of the e-pallet 102, camera data as to the user 110 of the e-pallet 102 including an image that depicts the user 110. In addition, in various embodiments, camera signal processing is performed. In various embodiments, camera signal processing is performed by a processor (such as the processor 142 and/or controller 160 of FIG. 1) based on camera signals provided by the one or more cameras 124. Also in various embodiments, the camera signal processing includes detection of the user 110.

Figure 5:
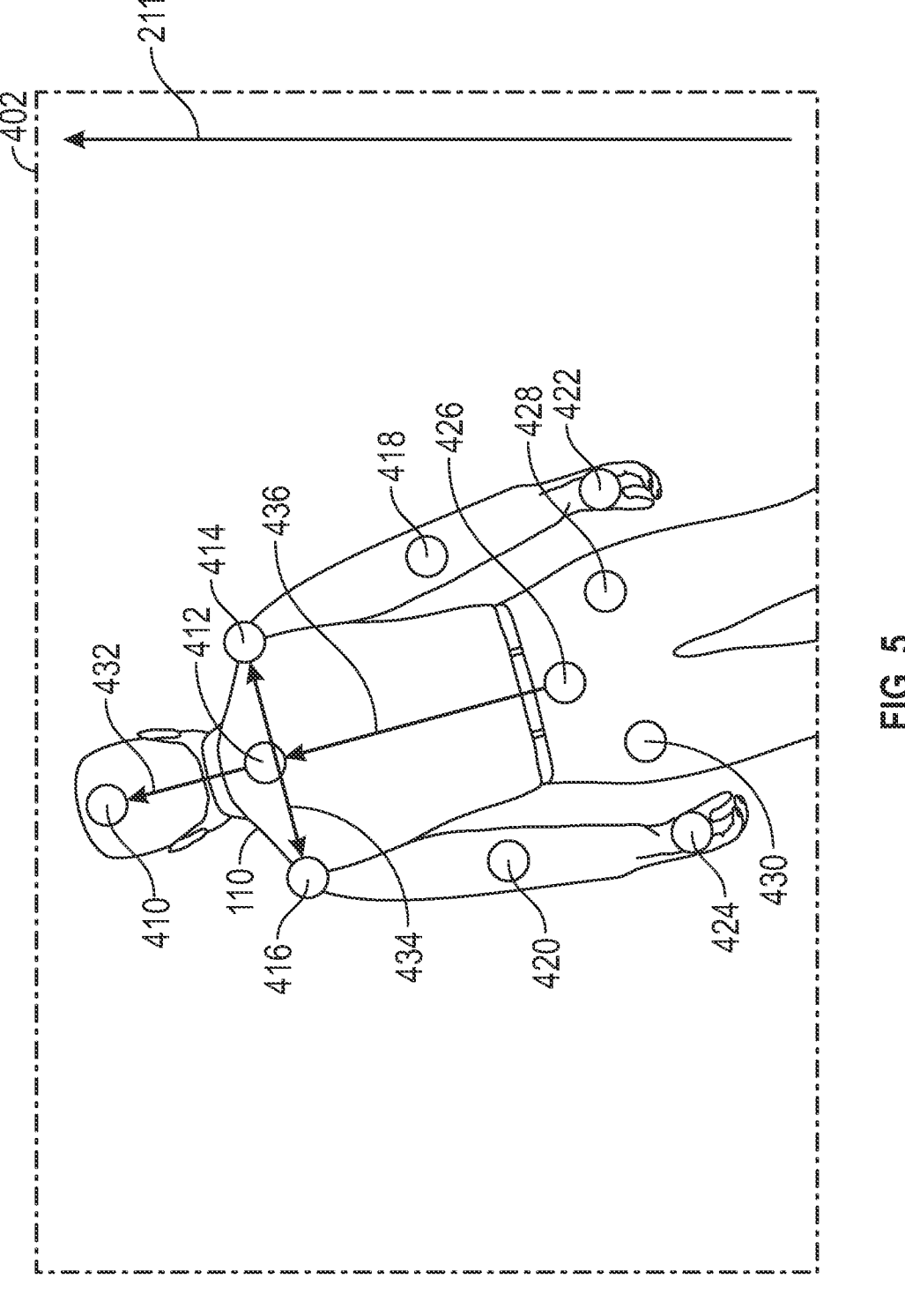
FIG. 5 depicts an exemplary image obtained by the e-pallet of FIG. 1 and method of analyzing such image in accordance with an exemplary embodiment.

Once an image comprising the user 110 is obtained, the method 300 may continue at 314 by detecting, via the processor, a relative orientation of the user 110 as represented in the image. At 316, the method 300 includes determining, via the processor, the user vertical vector 212 based on the relative orientation of the user 110. FIG. 5 illustrates a nonlimiting method of determining the user vertical vector 212 based on the relative orientation of the user 110 as represented in an image 400. In this example, the processor detects key points 410-430 associated with the user 110. The key points 410-430 may be based on various identifiers. In this example, the key points 410-430 are associated with corresponding anatomical parts of the user 110, such as a midpoint of the head (key point 410), a midpoint between the shoulders (key point 412), shoulders (key points 414 and 416), elbows (key points 418 and 420), wrists (key points 422 and 424), a midpoint of the pelvis (key point 426), and opposite points on the rear (key points 428 and 430). Alternatively, the key points 410-428 may be based on other aspects associated with the user 110. For example, in various embodiments, the user 110 may wear an article of clothing (e.g., a vest) that includes visually identifiable markings thereon that may be detected and used as key points. Notably, fewer or more key points may be used.

Once detected, the key points 410-428 may be used to determine the user vertical vector 212 based on the relative positions thereof in the image 400. For example, one or more user body vectors may be determined and used in combination to determine the user vertical vector 212. In various embodiments, the user body vectors extend between pairs of the key points 410-428. For example, FIG. 5 represents exemplary user body vectors 432 (between the key points 410 and 412), 434 (between the key points 414 and 416), and 436 (between the key points 412 and 426).

In various embodiments, the key points 410-428 may be detected and the user vertical vector 212 may be determined using a machine learning algorithm. The machine learning algorithm may be pre-trained with a plurality of training images containing various users at various positions, orientations, etc. In various embodiments, the training images may include identified key points and/or user body vectors. The systems and methods disclosed herein are not limited to any particular type of machine learning algorithm.

Referring again to FIG. 4, the method 300 includes at 318 determining the e-pallet vertical vector 211 based on the camera data. In various embodiments, the e-pallet vertical vector 211 may be based on an attribute of an image obtained by the one or more cameras 124 and/or an attribute of hardware of the one or more cameras 124. In the example of FIG. 5, the image 400 includes a frame 402 and the e-pallet vertical vector 211 is determined as parallel to a vertical edge of the frame 402.

In various embodiments, the method 300 includes performing a validity check to determine whether the user vertical vector 212 and/or the e-pallet vertical vector 211 can be reliably determined. In various embodiments, the validity check may include checking for faults in the one or more cameras 124, detecting that some or all of the camera data is missing, and/or determining a level of noise of the camera data. Aspects such as these may be compared to one or more thresholds to determine whether that the user vertical vector 212 and/or the e-pallet vertical vector 211 can be reliably determined with sufficient certainty. For example, if the one or more cameras 124 provide camera data including an image that is of sufficiently poor quality as to affect the reliability of the determinations, the validity check may determine that the user vertical vector 212 and/or the e-pallet vertical vector 211 cannot be determined with such camera data.

If a determination is made at 320 that the user vertical vector 212 and/or the e-pallet vertical vector 211 cannot be determined reliably, then the method 300 returns to 312 to obtain new camera data. In contrast, if a determination is made at 320 that the user vertical vector 212 and/or the e-pallet vertical vector 211 can be determined reliably, the method 300 includes at 322 determining, via the processor, a bank angle of the e-pallet 102 based on the user vertical vector 212 and the e-pallet vertical vector 211.

In various embodiments, the bank angle may be determined as a difference between the user vertical vector 212 and the e-pallet vertical vector 211. In various embodiments, the bank angle may be estimated over time to promote accuracy thereof, that is, such that it more closely matches the actual vertical direction (i.e., the vertical direction 210). For example, a first bank angle may be determined as a difference between the user vertical vector 212 and the e-pallet vertical vector 211 at a first time with first camera data obtained at the first time and a second bank angle may be determined as a difference between the user vertical vector 212 and the e-pallet vertical vector 211 at a second time with second camera data obtained at the second time. The first and second bank angles may then be used to determine the estimated bank angle over time. In various embodiments, the bank angle may be estimated in real-time using a plurality of camera data obtained over a predetermined time frame.

In various embodiments, the method 300 includes at 324 performing a second validity check to determine whether the determined bank angle is reliable. In various embodiments, the validity check may include an evaluation of a signal-to-noise ratio of the camera data. Aspects such as these may be compared to one or more thresholds to determine whether that the bank angle is reliable and/or has been determined with sufficient certainty. In various embodiments, a bank angle error may be estimated using variations of the camera data over time.

If a determination is made at 324 that the bank angle is not reliable, then the method 300 returns to 312 to obtain new camera data. In contrast, if a determination is made at 324 that the bank angle is reliable, the method 300 includes at 326 taking or performing a control action for the e-pallet 102, in accordance with instructions provided by the processor, based on the determined bank angle. In various embodiments, the step of taking the control action may include controlling, by the processor, movement of the e-pallet 102 by selectively controlling a propulsion speed of the e-pallet 102 and/or a yaw rate of the e-pallet 102 (and further the rest of the platoon), in accordance with the instructions provided by the processor, to remain below a preprogrammed safety threshold based on the bank angle. For example, in various embodiments, the e-pallet 102 may automatically takes appropriate action, such as immediately slowing down movement, and/or sounding a notification or alarm in response to a determination that the speed, yaw rate, and/or attitude of the e-pallet 102 is near or exceeds the safety threshold in view of the bank angle. In various embodiments, such actions are performed or facilitate by a processor (such as the processor 142 and/or controller 160 of FIG. 1). In various embodiments, the control action taken may be determined or modified with consideration to the estimated bank angle error.

Accordingly, methods, and systems are provided for promoting safe operation of e-pallets (and/or for promoting safe operation of one or more other types of moving platforms). As described in greater detail above, in various embodiments, the disclosed methods and systems utilize sensor data, including vision data (e.g., from cameras) in determining an orientation between the e-pallets and the user, for use in reducing the likelihood of rollover of e-pallets 102.

It will be appreciated that the systems, methods, and implementations may vary from those depicted in the Figures and described herein. For example, in various embodiments, the system 100 (e.g., including the e-pallets 102, the user 110, the communications network 113, and/or the remote server 112), components thereof, and/or other components may differ from those depicted in FIG. 1 and/or described above in connection therewith. It will also be appreciated that the implementations of FIG. 4 may vary, and also that various steps thereof may be performed simultaneously and/or in a different order, than those depicted in the Figures and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for reducing the likelihood of rollover for an e-pallet, the method comprising:

obtaining, via one or more cameras of the e-pallet, camera data as to a user of the e-pallet that is external to the e-pallet, wherein the camera data includes an image in which the user is depicted;

determining, via a processor using the camera data, a relative orientation of the user;

determining, via the processor, an e-pallet vertical vector based on the camera data;

determining, via the processor, a user vertical vector based on the relative orientation of the user, wherein determining the user vertical vector includes detecting two or more key points associated with the user within the camera data and extending vectors between pairs of the two or more key points;

determining, via the processor, a bank angle of the e-pallet based on the e-pallet vertical vector and the user vertical vector; and taking a control action for the e-pallet, in accordance with instructions provided by the processor, based on the bank angle, wherein the control action includes controlling movement of the e-pallet by selectively controlling a speed of the e-pallet and/or a yaw rate of the e-pallet, in accordance with the instructions provided by the processor, to remain below a preprogrammed safety threshold based on the bank angle.

2. The method of claim 1, wherein the step of determining the e-pallet vertical vector based on the camera data comprises:

obtaining, via the one or more cameras, the image in which the user is depicted, wherein the image includes a frame in which the user is depicted; and determining, via the processor, the e-pallet vertical vector based on a vertical edge of the frame of the image.

3. The method of claim 1, wherein the step of determining the user vertical vector based on the relative orientation of the user comprises, via the processor:

determining the user vertical vector based on the two or more key points using a machine learning algorithm that is pre-trained with a plurality of training images containing various users at various positions and orientations.

4. The method of claim 1, wherein the step of taking the control action comprises:

sounding a notification or alarm in response to a determination that the speed and/or the yaw rate exceeds the safety threshold in view of the bank angle.

5. The method of claim 1, wherein determining the bank angle of the e-pallet based on the e-pallet vertical vector and the user vertical vector comprises, via the processor:

determining a first difference between the e-pallet vertical vector and the user vertical vector based on the camera data at a first time to calculate a first bank angle;

determining a second difference between the e-pallet vertical vector and the user vertical vector based on the camera data at a second time to calculate a second bank angle; and determining an estimated bank angle over time based on the first bank angle and the second bank angle.

6. The method of claim 1, further comprising, via the processor:

determining a reliability of the bank angle based on a bank angle reliability threshold associated with a signal-to-noise ratio of the camera data; and taking the control action for the e-pallet, in accordance with the instructions provided by the processor, based on the bank angle and the reliability of the bank angle.

7. The method of claim 1, wherein the image depicts the user standing or walking within view of the e-pallet, the two or more key points are associated with corresponding anatomical parts of the user, and the method includes receiving, via the processor, commands from the user.

8. A system for reducing the likelihood of rollover for an e-pallet, the system comprising:

one or more cameras configured to obtain camera data as to a user of the e-pallet that is external to the e-pallet, wherein the camera data includes an image in which the user is depicted; and a processor coupled to the one or more cameras and configured to at least facilitate:

determining, using the camera data, a relative orientation of the user;

determining an e-pallet vertical vector based on the camera data;

determining a user vertical vector based on the relative orientation of the user, wherein determining the user vertical vector includes detecting two or more key points associated with the user within the camera data and extending vectors between pairs of the two or more key points;

determining a bank angle of the e-pallet based on the e-pallet vertical vector and the user vertical vector; and taking a control action for the e-pallet, in accordance with instructions provided by the processor, based on the bank angle, wherein the control action includes controlling movement of the e-pallet by selectively controlling a speed of the e-pallet and/or a yaw rate of the e-pallet, in accordance with the instructions provided by the processor, to remain below a preprogrammed safety threshold based on the bank angle.

9. The system of claim 8, wherein determining the e-pallet vertical vector based on the camera data comprises:

obtaining, via the one or more cameras, the image in which the user is depicted, wherein the image includes a frame in which the user is depicted; and determining the e-pallet vertical vector based on a vertical edge of the frame of the image.

10. The system of claim 8, wherein determining the user vertical vector based on the relative orientation of the user comprises:

determining the user vertical vector based on the two or more key points using a machine learning algorithm that is pre-trained with a plurality of training images containing various users at various positions and orientations.

11. The system of claim 8, wherein taking the control action comprises:

sounding a notification or alarm in response to a determination that the speed and/or the yaw rate exceeds the safety threshold in view of the bank angle.

12. The system of claim 8, wherein determining the bank angle of the e-pallet based on the e-pallet vertical vector and the user vertical vector comprises:

determining a first difference between the e-pallet vertical vector and the user vertical vector based on the camera data at a first time to calculate a first bank angle;

determining a second difference between the e-pallet vertical vector and the user vertical vector based on the camera data at a second time to calculate a second bank angle; and determining an estimated bank angle over time based on the first bank angle and the second bank angle.

13. The system of claim 8, wherein the processor is configured to facilitate:

determining a reliability of the bank angle based on a bank angle reliability threshold associated with a signal-to-noise ratio of the camera data; and taking the control action for the e-pallet, in accordance with the instructions provided by the processor, based on the bank angle and the reliability of the bank angle.

14. The system of claim 8, wherein the image depicts the user standing or walking within view of the e-pallet, the two or more key points are associated with corresponding anatomical parts of the user, and the processor is configured to facilitate receiving commands from the user.

15. The system of claim 8, wherein the image depicts the user standing or walking within view of the e-pallet, the two or more key points are associated with corresponding visually identifiable markings on an article of clothing worn by the user, and the processor is configured to facilitate receiving commands from the user.

16. An e-pallet device comprising:

a body;

one or more cameras disposed on or within the body and configured to obtain camera data as to a user of the e-pallet device that is external to the body, wherein the camera data includes an image having a frame in which the user is depicted; and a processor that is coupled to the one or more cameras, the processor configured to at least facilitate:

determining, using the camera data, a relative orientation of the user;

determining an e-pallet vertical vector based on an edge of the frame of the image;

determining a user vertical vector based on the relative orientation of the user, wherein determining the user vertical vector includes detecting two or more key points associated with the user within the camera data and extending vectors between pairs of the two or more key points and determining the user vertical vector based on one or more of the body vectors;

determining a bank angle of the body based on the e-pallet vertical vector and the user vertical vector; and controlling movement of the body by selectively controlling a speed of the body and/or a yaw rate of the body, in accordance with instructions provided by the processor, to remain below a preprogrammed safety threshold based on the bank angle.

17. The e-pallet device of claim 16, wherein determining the user vertical vector based on the relative orientation of the user comprises:

determining the user vertical vector based on the two or more key points using a machine learning algorithm that is pre-trained with a plurality of training images containing various users at various positions and orientations.

18. The e-pallet device of claim 16, wherein determining the bank angle of the body based on the e-pallet vertical vector and the user vertical vector comprises:

determining a first difference between the e-pallet vertical vector and the user vertical vector based on the camera data at a first time to calculate a first bank angle;

determining a second difference between the e-pallet vertical vector and the user vertical vector based on the camera data at a second time to calculate a second bank angle; and determining an estimated bank angle over time based on the first bank angle and the second bank angle.

19. The e-pallet device of claim 16, wherein the processor is configured to facilitate:

determining a reliability of the bank angle based on a bank angle reliability threshold associated with a signal-to-noise ratio of the camera data; and controlling the movement of the body, in accordance with instructions provided by the processor, based on the bank angle and the reliability of the bank angle.

20. The e-pallet device of claim 16, wherein the image depicts the user standing or walking within view of the e-pallet, the two or more key points are associated with corresponding anatomical parts of the user or associated with corresponding visually identifiable markings on an article of clothing worn by the user, and the processor is configured to facilitate receiving commands from the user.

* * * * *